(No Model.)　　　　　　　　　　　　　　　　　2 Sheets—Sheet 1.
B. F. RADFORD.
CLUTCH MECHANISM FOR COUNTER SHAFTING.
No. 258,472.　　　　　　　　　　　Patented May 23, 1882.
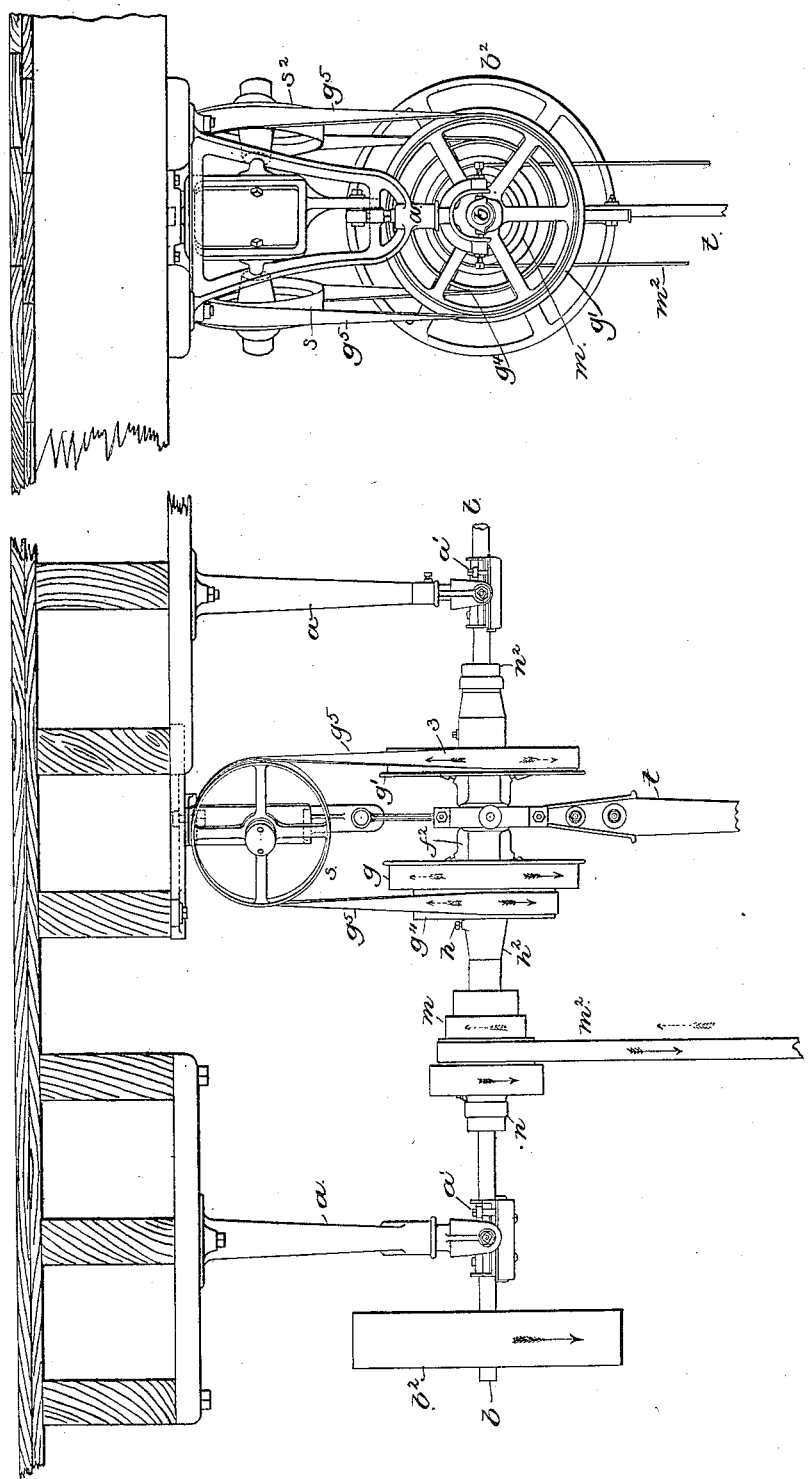
Witnesses.
John F. C. Prinkert,
W. H. Sigston
Inventor:
Benjamin F. Radford
by Crosby & Gregory
Attys.

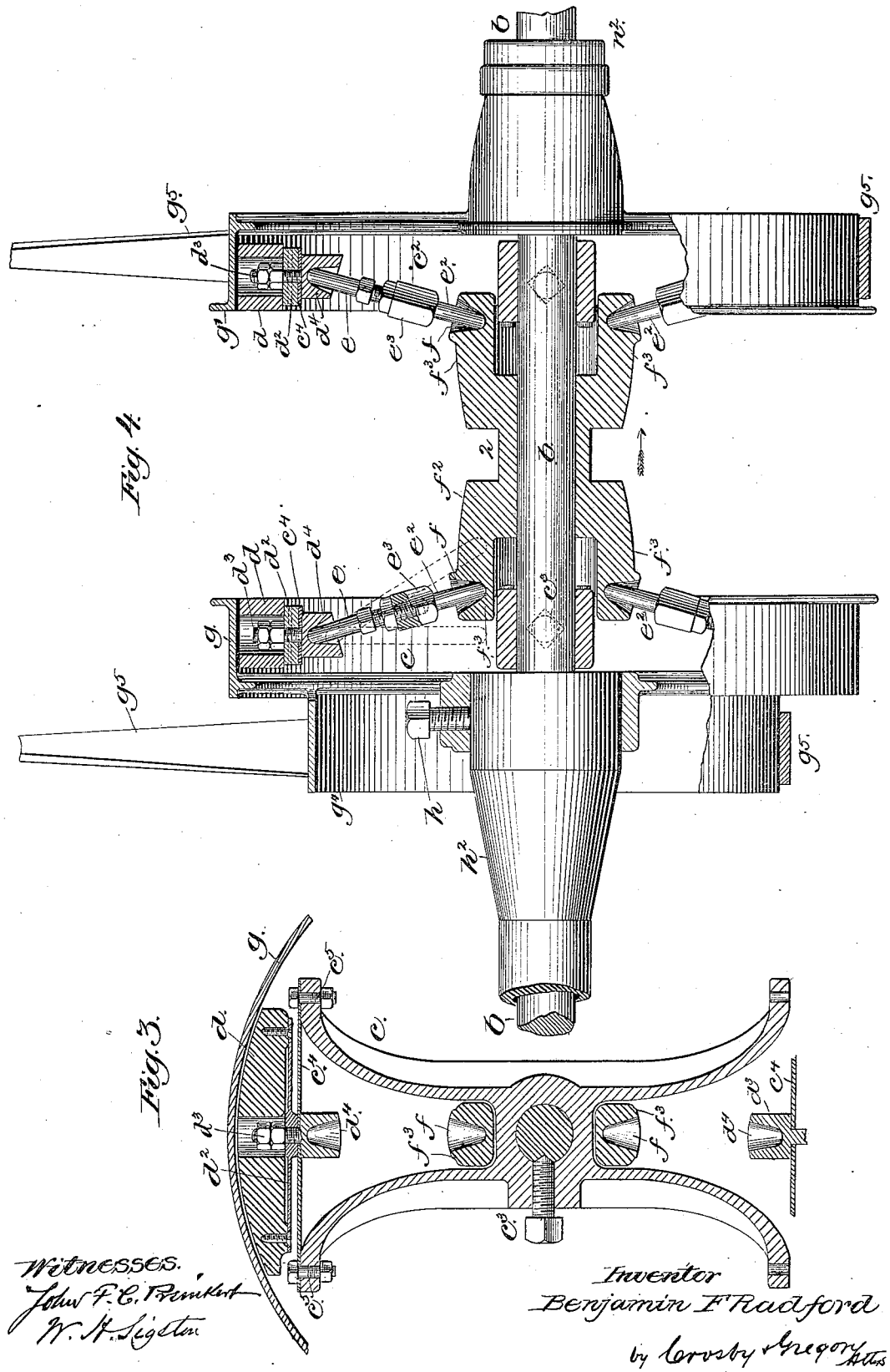

UNITED STATES PATENT OFFICE.

BENJAMIN F. RADFORD, OF HYDE PARK, MASSACHUSETTS.

CLUTCH MECHANISM FOR COUNTER-SHAFTING.

SPECIFICATION forming part of Letters Patent No. 258,472, dated May 23, 1882.

Application filed February 23, 1882. (No model.)

*To all whom it may concern:*

Be it known that I, BENJAMIN F. RADFORD, of Hyde Park, county of Norfolk, State of Massachusetts, have invented an Improvement in Clutch Mechanism for Counter-Shafting, of which the following description, in connection with the accompanying drawings, is a specification.

This my invention has for its object the production of a counter-shaft mechanism of such construction that the cone or other pulleys thereon or power-conveying means may be driven in one or the other direction at will without change in the direction of rotation of the counter-shaft.

My invention as herein shown includes a counter-shaft driven continuously in one direction, it having attached to it parts of two friction-clutches which are adapted to be engaged with either of two belt-pulleys loose on the counter-shaft, one of the said belt-pulleys having a sleeve which carries the cone-pulley which is to be rotated on the counter-shaft in one or the other direction, according to which of the two belt-pulleys is engaged and driven by the clutch.

In factories containing lathes and other machinery driven from counter-shafts the ceiling is sometimes almost hidden by the net-work of open or plain and crossed belts employed to drive the pulleys on the counter-shafts, which in turn actuate the machine-belt in one or the other direction. These belts near the ceiling, as soon as covered with oil, become so dark in color as to darken the room. With such belts the ceiling cannot be kept white, because of the oil and dust thrown thereon by the belts.

By my invention nearly all the horizontal belting heretofore employed with counter-shafts may be dispensed with, thus making a very important saving in each room, according to the number of machines, lathes, &c., being driven. By my plan I employ a single line of counter-shafting for each line of machinery, lathes, &c., to be driven, and I drive each line of counter-shafting continuously in one direction by a single belt, and I am enabled to dispense with the usual open and crossed belts heretofore required for each machine to be driven from the counter-shaft.

Figure 1 represents in side elevation a sufficient portion of a counter-shaft and its co-operating parts to illustrate my invention; Fig. 2, a right-hand end view of Fig. 1; Fig. 3, an enlarged sectional detail of the friction-clutch block and its carrying-arm, the counter-shaft, and part of the rim of the pulley to be engaged by it; and Fig. 4, an enlarged broken side detail and section, showing the loose pulleys on the counter-shaft and the quill and strut and clutch-shoes to engage and move the said pulleys according to the position of the quill.

The hangers $a$ and boxes $a'$ for them are and may be of any usual construction.

The counter-shaft $b$, of any desired length, according to the size of the room and the number of machines to be driven by it, has at one end a pulley, $b^2$, which will be driven continuously in one direction by a single belt from any usual main driving-shaft, which will be extended into or through the said room.

The counter-shaft $b$ for each machine to be actuated from it is provided with two double forked arms, $c\,c^2$, each having a central hub secured to the shaft by a suitable set-screw, $c^3$. These forked arms at each end are provided with flexible or yielding plates or clutch-shoe holders $c^4$, composed preferably of pieces of sheet-steel secured to the said arms by bolts $c^5$. These yielding plates or clutch-shoe holders support the clutch box or shoes $d$, composed of wood or metal, covered, if desired, with leather or other suitable material. Each shoe is herein shown as provided with a back piece, $d^2$, which is connected with the yielding plate or clutch-shoe holder by a bolt, $d^3$, having preferably a socketed head, $d^4$, to receive one end of a strut composed of two pieces, $e\,e^2$, connected together and made adjustable by means of screw-threads and a nut, $e^3$. The lower end of each strut is inserted in a socket, $f$, of the quill $f^2$, placed loosely on the counter-shaft $b$.

The normal position of the yielding plate or clutch-shoe holder $c^4$ is as shown in Fig. 3, and the convexed outer face of the shoe is held from contact with the interior of the rim of the pulleys $g$ or $g'$.

As shown in Fig. 4, the quill is held in a central position, and the shoes carried by both the forked arms $c\,c^2$ are removed from contact with the pulleys $g$ $g'$; but to engage the said shoes with one or the other of the said pulleys it is only necessary to move the quill horizontally on the shaft $b$ toward the pulley $g$ or $g'$ which it is desired to rotate positively, when the strut next the pulley to be rotated will be placed into a more nearly vertical position, as shown at the left of Fig. 4 in dotted lines, which will move the yielding plate and shoe outward from the shaft $b$, and force the said shoe closely in contact with the interior of the rim of the pulley to be driven by the clutch and to be moved with the shaft $b$. Movement of the quill away from either pulley $g$ or $g'$ (both loose on the shaft $b$) will effect the disengagement of the shoe from that pulley.

Each forked arm $c$ $c^2$ will have at each end a shoe-holder and shoe, as shown at one end of the arm $c$ in Fig. 3.

The pulley $g$ is attached by a screw, $h$, to a sleeve, $h^2$, loose on the counter-shaft $b$, and this sleeve at its outer end is provided with the cone-pulley $m$, of any suitable shape and size, on which is placed the belt $m^2$, which descends to and is made effective in driving the lathe or other machine to be driven by the vertical belt $m^2$. The portion $g^4$ of pulley $g$ which receives the reversing-band $g^5$ is smaller in diameter than the portion of pulley $g'$ about which the same band is extended.

The counter-shaft $b$ for each machine to be actuated from it will be provided with two loose pulleys, a cone-pulley, quill, struts, and reversing-band, such as shown in the drawings. Collars $n$ $n^2$ and the hubs of the forked arms $c$ $c^2$ prevent longitudinal movement of the pulleys on the shaft $b$.

The reversing-band is turned about directing-pulleys $s$ $s^2$, having their journals out of line, as shown, to enable the belt $g^5$ to run over two pulleys of different diameter, but having a common center or axis of rotation.

The quill is provided, as herein shown, with an annular groove, 2, to receive the shipper-lever $t$, which is extended down within easy reach of the operator.

The sockets $f$ are made in prongs $f^3$ of the quill, and the said prongs are sufficiently long to always remain in place between the parts of the arms $c$ $c^2$, whatever may be the position of the quill $f$ on the shaft $b$. Hence the quill in all its positions is driven positively with the shaft $b$, but without being keyed or splined to it, which saves labor and expense.

Assuming the pulley $b^2$ fixed to shaft $b$ to be rotated continuously in the direction of the arrow on it in Fig. 1, then the two arms which carry the clutch-shoe holders and shoes will always move in the same direction, and they will carry with them in the same direction either of the two pulleys $g$ or $g'$ with which the clutches are pressed or forced in engagement—as, for instance, if the two clutches, which will be carried preferably by the arm $c$, are pressed into engagement with the loose pulley $g$, it will be moved in the direction of the full arrow on it—the direction of the pulley $b^2$—and will drive the cone-pulley $m$ in the same direction at the slow speed required for the belt $m^2$. While the pulley $g$ is being moved in the same direction as shaft $b$ the belt $g^5$ will run the loose pulley $g'$ in the reverse direction, as designated by the full arrow 3. When it is desired to run the pulley $g$ and the cone-pulley $m$ in the direction opposite the full arrows thereon, the quill $f$ will be moved in the direction of the arrow near it in Fig. 4 to force the shoes carried by the arm $c^2$ out against and in contact with the pulley $g'$ and to withdraw the shoes of arm $c$ from the pulley $g$, when the pulley $g'$ will be rotated in the direction of the rotation of the shaft $b$; but by the reversing-belt $g^5$ on the band-receiving part $g^4$ of pulley $g$ (the said band-receiving portion being of smaller diameter than the portion of the pulley $g'$ over which the said belt $g^5$ is extended) the loose pulley $g$ and cone-pulley will both be rotated about the shaft $b$ in a direction opposite the direction of rotation of the latter, and in the direction designated by the dotted arrows shown in Fig. 1, and at the fast speed of the cone-pulley.

The shoes are rendered self-disengaging by means of the elastic plates $c^4$.

I do not desire to limit myself to the exact construction of shoe and quill and struts to engage the pulleys, but consider that my invention includes any well-known equivalent mechanism therefor, connected with and moving in unison with the counter-shaft, which will enable either of the two loose pulleys to be engaged and driven positively in unison with the counter-shaft, and so that when one or the other of the said two pulleys is so engaged the cone-pulley $m$, or any other suitable driving-pulley, through the medium of the reversing-belt, will be moved in one direction and then in the opposite direction, as may be desired.

Dispensing with the many open and crossed belts heretofore employed to drive the pulleys on the usual counter-shafts, besides saving the cost of belts, also very materially economizes power, and the ceiling may be kept clean and white, thus adding to the light and healthfulness of the room.

Instead of the cone-pulley $m$, it is obvious I might substitute a toothed gear or other usual power-conveying means.

I claim—

1. The counter-shaft $b$, adapted to be rotated continuously in one direction, clutches carried and moved in unison with it, and two pulleys loose on the said counter-shaft, combined with a reversing-belt extended about both of the said loose pulleys, and supported on suitable pulleys, whereby when one of the said loose pulleys is being driven in unison with the said counter-shaft the other pulley will at the same time be driven in opposite directions, substantially as and for the purpose described.

2. The shaft $b$, its attached arms $c$ $c^2$, the quill loose on the said shaft, and the struts supported by the said quill, combined with the plates, and shoes, and two loose pulleys, either of which may be driven at will with and in the direction of rotation of the shaft $b$, for the purpose described.

3. The shaft $b$, and its attached shoe carrying arms $c\ c^2$, and struts, combined with the quill loose on the said shaft, and having prongs engaged at all times with the said arms to insure the rotation of the quill with the shaft $b$, substantially as described.

4. The shaft $b$, adapted to be moved continuously in one direction, two loose pulleys thereon, one of which carries a pulley, $m$, and has a belt-receiving portion, $g^4$, of smaller diameter than the belt-receiving portion of the other loose pulley, combined with a reversing-belt, and means, substantially as described, to connect either of the said two loose pulleys with and move it in unison with the said shaft, and reverse the movement of the other loose pulley, as and for the purpose set forth.

5. The adjustable struts, the arms $c\ c^2$, yielding plates, shoes, and socketed pieces $d^4$, combined with the quill having sockets $f$ to receive one end of each strut, substantially as and for the purpose described.

In testimony whereof I have signed my name to this specification in the presence of two subscribing witnesses.

BENJAMIN F. RADFORD.

Witnesses:
  G. W. GREGORY,
  M. M. WHIPPLE.